(12) United States Patent
Matiash et al.

(10) Patent No.: US 10,486,257 B2
(45) Date of Patent: Nov. 26, 2019

(54) WELDING TYPE POWER SUPPLY WITH TRANSFORMER

(71) Applicant: Illinois Tool Works Inc., Glenview, IL (US)

(72) Inventors: Nicholas A. Matiash, Oshkosh, WI (US); Brian A. Schwartz, Appleton, WI (US); Kenneth C. Altekruse, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1019 days.

(21) Appl. No.: 14/535,575

(22) Filed: Nov. 7, 2014

(65) Prior Publication Data

US 2016/0129519 A1 May 12, 2016

(51) Int. Cl.
*B23K 9/10* (2006.01)
*H01F 37/00* (2006.01)
*H01F 5/02* (2006.01)
*H01F 38/08* (2006.01)
*H01F 27/32* (2006.01)
*H01F 27/00* (2006.01)
*H01F 27/30* (2006.01)

(52) U.S. Cl.
CPC ............. *B23K 9/1043* (2013.01); *H01F 5/02* (2013.01); *H01F 27/006* (2013.01); *H01F 27/306* (2013.01); *H01F 27/325* (2013.01); *H01F 37/00* (2013.01); *H01F 38/085* (2013.01)

(58) Field of Classification Search
CPC ...... H01F 21/005; H01F 21/04; G01D 5/2073
USPC ..... 336/192, 198, 208; 219/130.21, 60, 60 R
See application file for complete search history.

(56) References Cited

U.S. PATENT DOCUMENTS

| | | | | | |
|---|---|---|---|---|---|
| 4,857,878 | A | * | 8/1989 | Eng, Jr. | H01F 27/306 336/192 |
| 6,154,113 | A | * | 11/2000 | Murai | H01F 27/2828 336/192 |
| 6,864,777 | B2 | * | 3/2005 | Sigl | H01F 38/085 336/192 |
| 2009/0261934 | A1 | * | 10/2009 | Wolfgram | H01F 27/325 336/182 |
| 2011/0049115 | A1 | * | 3/2011 | Luo | B23K 9/1006 219/130.21 |
| 2012/0081204 | A1 | * | 4/2012 | Garrity | H01F 27/2847 336/221 |
| 2014/0021180 | A1 | | 1/2014 | Vogel | |

* cited by examiner

*Primary Examiner* — Tu B Hoang
*Assistant Examiner* — Thomas J Ward
(74) *Attorney, Agent, or Firm* — George R. Corrigan

(57) ABSTRACT

A method and apparatus for providing welding type power, including a power and control circuit is disclosed. The power circuit provides welding, control and aux power. The control and aux power are provided with a transformer, and secondary windings for control and aux power are wound on a single bobbin, with a winding separator separating them. Air vents, which can be formed by fins on the bobbin or separator allow cooling of the inner winding.

17 Claims, 5 Drawing Sheets

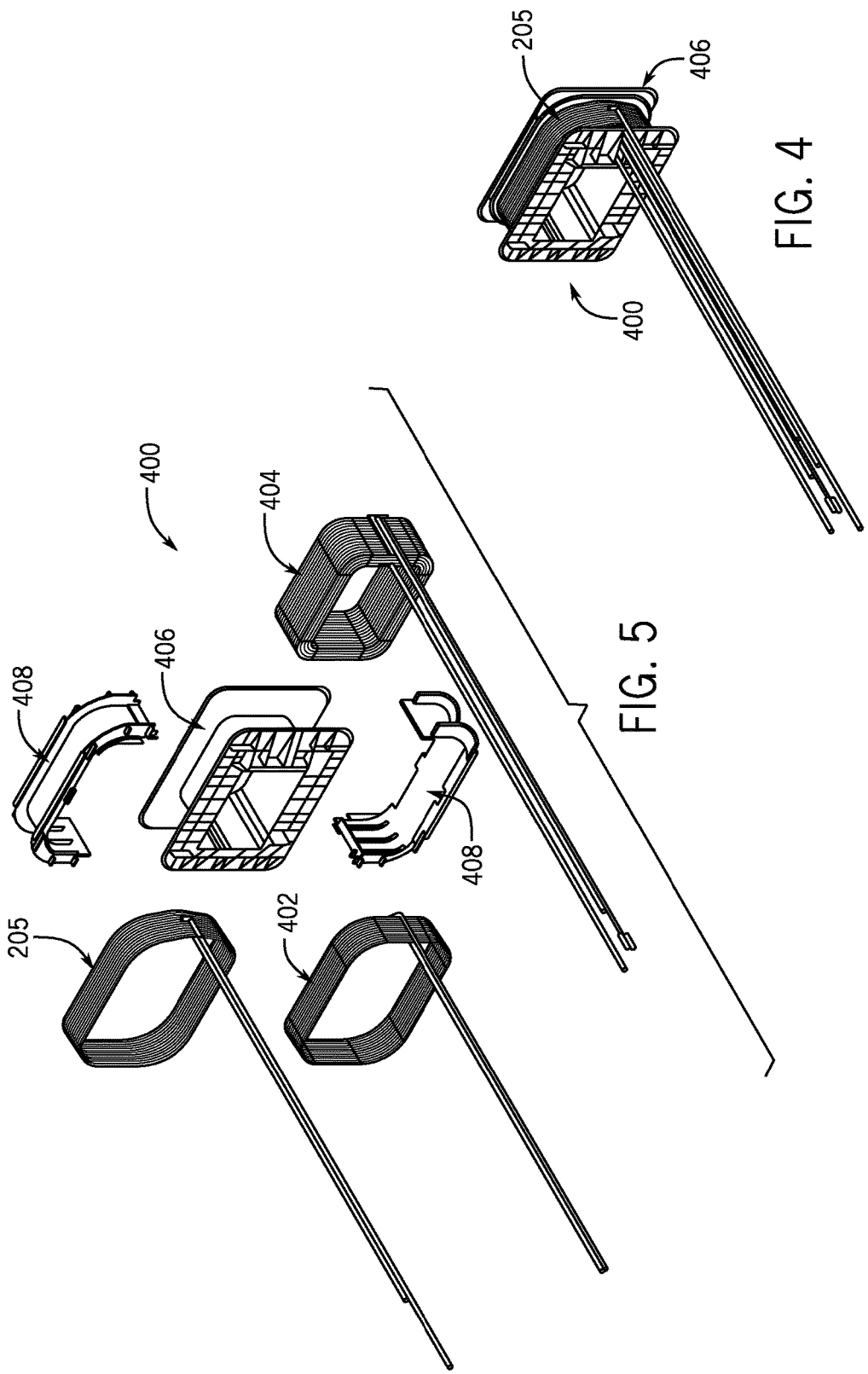

WELDING TYPE POWER SUPPLY WITH TRANSFORMER

FIELD OF THE INVENTION

The present disclosure relates generally to welding type power supplies having electrical transformers. More specifically, it relates to transformers for use in creating control power and auxiliary power.

BACKGROUND OF THE INVENTION

Transformers are commonly used in welding type power supplies. Welding type power supply, as used herein, is a power supply that provides a welding type output. Welding type output, as used herein, is an output suitable for welding, plasma cutting, or induction heating. Welding type power supplies have a wide variety of topologies. For example, they can include a preregulator to provide a bus, and have an output converter that converts the bus into a desired current and voltage. Examples of preregulators include boosts, bucks, rectifiers, etc. Examples of output converters, include inverters, boosts, bucks, choppers, etc. Welding type power supplies can have additional, intermediate stages, and can receive utility power as input power, or include a generator.

Many welding type power supplies include an auxiliary power output. This is often provided at 120 volts (or other utility voltages power), and can be derived by transforming input power, or derived from a bus by a converter (such as an inverter). Auxiliary power derived by inverting the bus is also usually transformed (to provide the desired 120V ac). Thus, when auxiliary power is provided, it is common to have an auxiliary power transformer.

Welding type power supplies also generally need control power to power switches, electronics, and processors. Control power is also derived by transforming input power, or derived from a bus by a converter (such as inverter or buck converter). Control power derived by inverting the bus is also usually transformed (to provide the desired control voltages). Thus, it is common to have a control power transformer.

One prior art welding power supply transformer for weld power is described in U.S. Pat. No. 6,864,777, hereby incorporated by reference. Some prior art transformers include a central bobbin having a coil winding window disposed about a central opening in the bobbin. The central opening is provided to receive one or more laminated or ferrite magnetic cores. Standard off-the-shelf magnetic cores are available in a wide variety of sizes and shapes, many of which have square or rectangular cross-sections. The coil windings typically also have rectangular or square cross sections wound close to the magnetic cores. This is because it is generally desirable to keep the coil windings close to the magnetic core to maximize the magnetic coupling between the magnetic core and the coil windings.

Control and auxiliary power transformer windings can be purchased, but is is generally costly to purchase windings. Also, each transformer adds weight and cost to the welding type power supply. Thus, it is desirable to have a reduced number of transformers. Windings and transformers tend to be components that need cooling.

Another problem with welding power supply transformers, is providing adequate insulation between windings, and preventing creepage between windings. leakage inductance.

Thus, it is desirable to provide control and auxiliary power without having separate transformers. Preferably there will be an effective way to cool both the auxiliary and control windings, and there will be adequate insulation and adequate creepage distance between the windings.

SUMMARY OF THE PRESENT INVENTION

According to a first aspect of the disclosure a welding type power supply includes a power circuit and a control circuit. The power circuit receives input power and provides welding type power on a welding output. The power circuit also provides control power to the controller and auxiliary power on an auxiliary power output. The control circuit controls the power circuit. The power circuit includes a transformer for the aux and control power. The transformer includes a secondary bobbin having the control power and aux power secondary windings wound thereon. A winding separator is disposed over one of the secondaries, and under the other.

According to a second of the disclosure a welding type power supply includes a power circuit and a control circuit. The power circuit receives input power and provides welding type power, along with control power and aux power. The control circuit controls the power circuit, and has a transformer. The transformer has a primary winding, a control power secondary winding, and an auxiliary power secondary winding. The transformer also has a secondary bobbin with the control power secondary and the auxiliary power secondary wound thereon. A plurality of air vents allow air flow into the bobbin. The transformer also has a primary bobbin with the primary winding wound thereon.

The winding separator is disposed over the auxiliary power secondary winding, and the winding separator is disposed under the control power secondary winding in one alternative.

The control power secondary winding is comprised of multiple windings that provide a plurality of voltages in various embodiments.

The winding separator has one or more protruding lips that provide electrical insulation and increases the creepage distance between the auxiliary power secondary winding and the control power secondary winding in another alternative.

The transformer also has a primary bobbin with primary winding wound thereon in another alternative.

A plurality of fins define air vents between the winding separator and the bobbin to allow air flow to the first one of the control power secondary winding and the auxiliary power secondary winding in one embodiment.

The fins are on the winding separator and provide structural support to the winding separator in other embodiments.

The winding separator has one or more protruding lips that provide for electrical insulation and increase the creepage distance between the control power secondary winding and the auxiliary power secondary winding in another embodiment.

The plurality of fins extend along the at least one protruding lip in various embodiments.

The at least one protruding lip includes two protruding lips in another embodiment.

A winding separator is disposed between the auxiliary power secondary winding and the control power secondary winding, and the winding separator includes fins that define the air vents.

Other principal features and advantages of will become apparent to those skilled in the art upon review of the following drawings, the detailed description and the appended claims.

BRIEF DESCRIPTION OF THE DRAWINGS

FIG. 4 is a perspective view of a secondary assembly of FIGS. 2 and 3;

FIG. 5 is an exploded view of the secondary assembly of FIG. 4;

Figure 1:
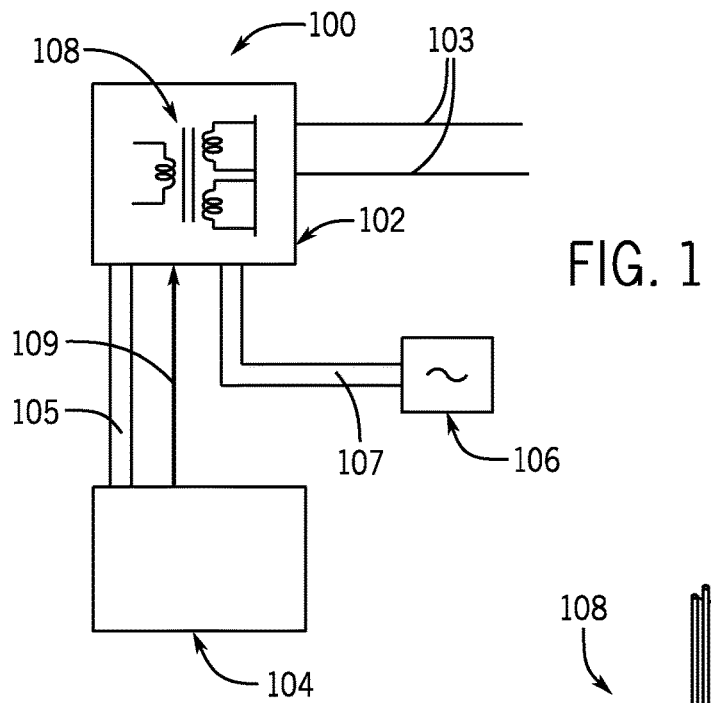
FIG. 1 is a block diagram of a welding type power supply.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to a particular power supply and transformer, it should be understood at the outset that the invention can also be implemented with other components.

Generally, in accordance with the invention a welding type power supply 100 (FIG. 1) includes a power circuit 102 and a control circuit 104. Other items, such as a generator, wire feeder, welding gun, robot, etc. can be included. Welding type power supply 100 also includes an auxiliary power output module 106, to which utility power (or other aux power) is provided on output 107. In the preferred embodiment module 106 provides 120 VAC at 60 Hz to the user.

Power circuit 102 receives input power, such as power from a utility or generator, and provides welding type power on a welding output 103. In the preferred embodiment power circuit 102 includes a preregulator, a high voltage split bus, and a stacked inverter output, such as that shown in patent application Ser. No. 13/839,235, published as US-2014-0021180-A1, hereby incorporated by reference. Alternatives provide for using other topologies. Power circuit 102 includes a transformer 108 which receives power and provides control and aux power. In the preferred embodiment the input to the primary of transformer 108 is a power derived from a bus, such as by an inverter. The primary may alternatively be connected to utility or generator input power.

Control power is provided on output 105 to controller 104. Controller 104 (also called a control circuit) may be located on one or more boards in one or more places, and can include analog and digital components, including processors, and can include software. Control circuit 104 is connected on output 109 to control power circuit 102. Control circuit may also receive feedback, such as of the load, the bus voltages, the type of input, etc. It may also receive user inputs, such as process selection, set points, etc.

Figure 2:
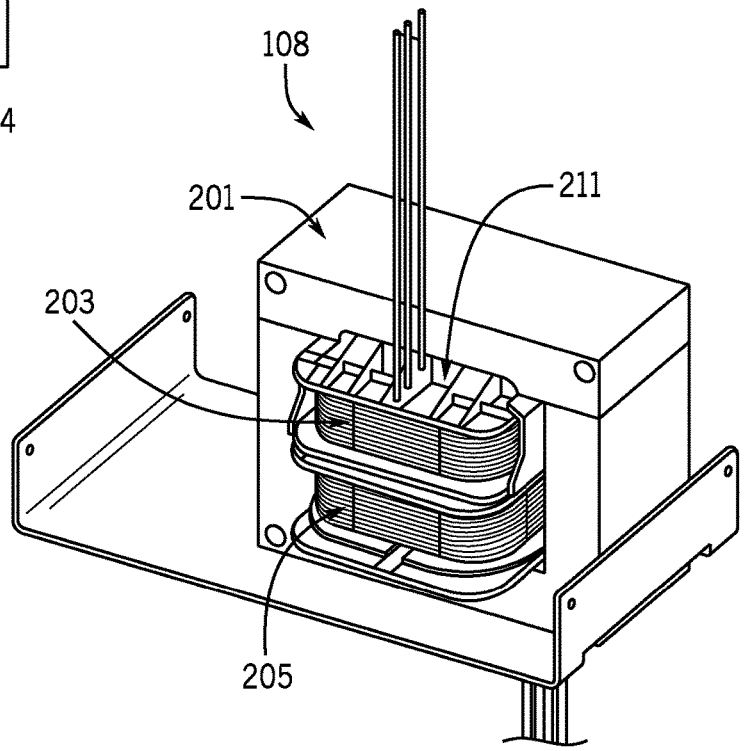
FIG. 2 is a perspective view of a transformer.
Figure 3:
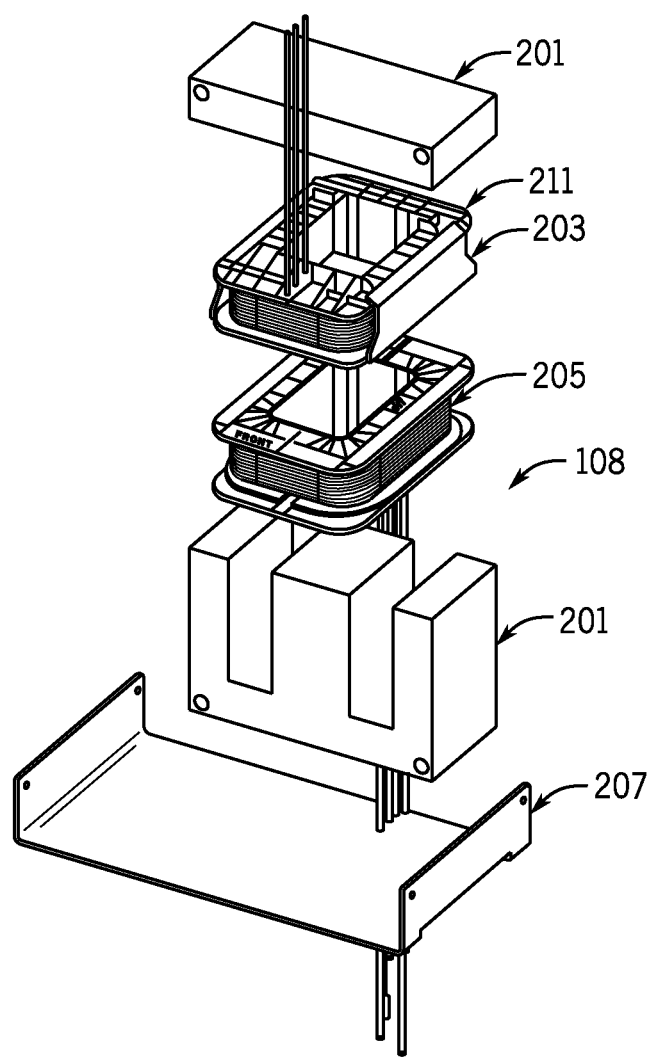
FIG. 3 is an exploded view of the transformer of FIG. 2.

Transformer 108 is shown in FIGS. 2 and 3, and includes a core 201, a primary winding 203, secondary windings 205 and a base 207. Primary winding 203 is preferably wound about a bobbin 211.

Secondary windings 205 are shown in more detail in FIGS. 4 and 5, as part of secondary assembly 400. Secondary assembly 400 includes control power secondary winding 205, an additional control power secondary winding 402 (two control power windings are used to provide two different voltages—24V and 36V in the preferred embodiment), an aux power secondary winding 404, a bobbin 406, and a winding separator 408. The outputs of windings 205 and 402 are provided on lines 105 to control circuit 104. The output of winding 404 is provided on lines 107 to aux module 106.

Alternatives provide for using one control power winding, omitting the aux power winding, and/or omitting the winding separator, or changing the order of the windings, such that one or both control windings are under the separator, and the aux power winding is above the separator. Also, windings for other purposes, including a weld power winding, could be included.

Secondary assembly 400 is assembled with winding 404 wound about bobbin 406. Winding separator 408 is placed over winding 404. Winding separator, as used herein, is a part that is formed or shaped to separate windings, and that provides structure about which a winding may be wound. It does not include tape, in the preferred embodiment, although other embodiments have tape between the windings. Then, winding 402 is wound about winding separator 408. Winding 205 is wound over winding 402 (paper can be used to separate windings 205 and 402). As will be described in more detail below, winding separator 408 provides insulation and increases the creepage distance between windings 404 and 402. Also, winding separator 408 provides for air flow past winding 205 and winding 402 to reach winding 404. Alternatives provide for not including provisions for air flow.

Figure 8:
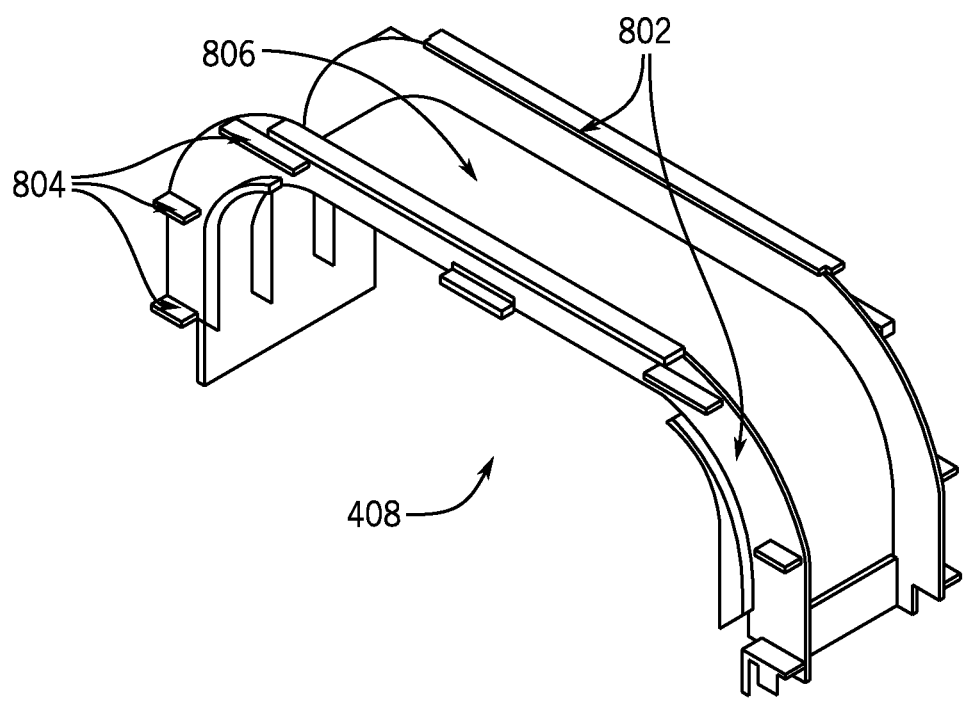
FIG. 8 is a perspective view of half of a winding separator of FIGS. 3 and 4.

Turning now to FIG. 8, an upper half of winding separator 408 is shown in more detail. The bottom half of winding separator 408 is identical to the upper half, and in assembly they are each placed over winding 404, so as to form a complete winding separator. Alternatives provide for asymmetrical halves of winding separator 408. Winding 402 is wound about a winding surface 806 of winding separator 408. Winding separator 408 includes protruding lips 802, which extend from winding surface 806. A protruding lip on a winding separator, as used herein, is an extension of the separator that extends away from the surface about which a winding is wound. Surface 806 provides insulation between windings 402 and 404. Lips 802 provide insulation and increase the creepage distance between windings 402 and 404. Alternatives provide for a single protruding lip 802, or different size and shape lips.

A plurality of fins 804 extend from protruding lips 802. Fins 804 offset winding separator from the side of bobbin 406. Fins 804 define spaces therebetween that act as air vents for air to flow between winding separator 408 and the side of bobbin 406. This allows air to flow to and cool winding 404. Fins 804 also provide structural support for winding separator 408. Alternatives provide for the vents being on surface 806, such as the backside of surface 406.

Figure 6:
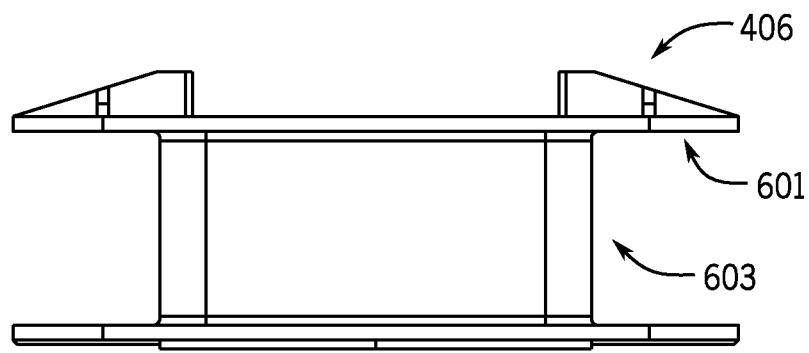
FIG. 6 is a side view of the secondary bobbin of FIGS. 3 and 4.
Figure 7:
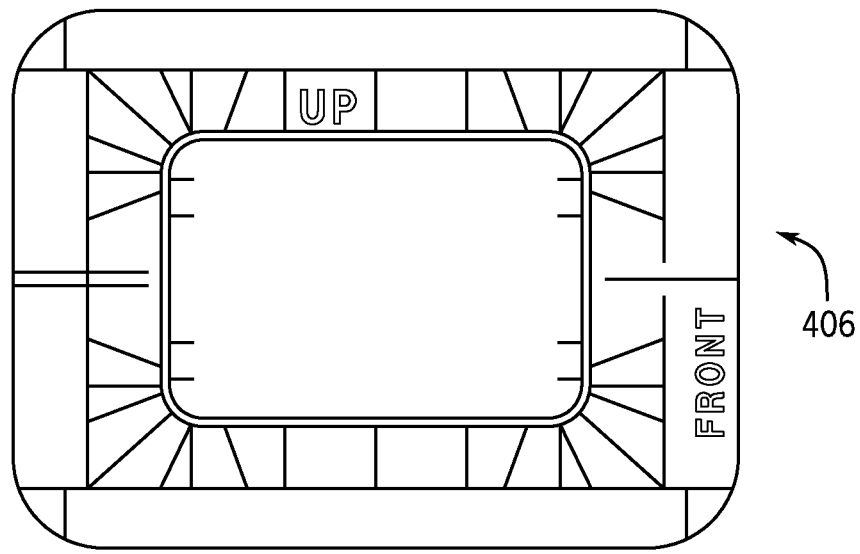
FIG. 7 is a top view of the secondary of FIG. 6.

Turning now to FIGS. 6 and 7 bobbin 406 is shown in more detail, and includes a winding surface 603 and sides 601. Fins 804 (FIG. 8) offset winding separator 408 from sides 601 of bobbin 406, to allow air flow between the bobbin and the windings, for cooling inner windings. One alternative includes having fins on sides 601 to provide the offset for airflow. Another alternative provides for omitting winding separator 408, and using fins (or other structures) on bobbin 406 to offset the windings from sides 601. Another alternative provides for vents in surface 603 or sides 601 to provide air flow for cooling the core in the center of bobbin 406. Primary bobbin 211 can have a design similar to that of secondary bobbin 406.

Numerous modifications may be made to the present disclosure which still fall within the intended scope hereof. Thus, it should be apparent that there has been provided a method and apparatus for a welding type power supply with a transformer that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. A welding type power supply, comprising:
a power circuit, disposed to receive input power and provide welding type power to a welding output, control power to a control power output and auxiliary power to an auxiliary power output; and
a control circuit connected to control the power circuit and connected to receive the control power output;
wherein the power circuit includes a transformer, and the transformer has a primary winding, a control power secondary winding in electrical communication with the control power output, and an auxiliary power secondary winding in electrical communication with the auxiliary power output, and further wherein the transformer includes a secondary bobbin having the control power secondary winding and the auxiliary power secondary winding wound thereon, wherein a winding separator is disposed over a first one of the control power secondary winding and the auxiliary power secondary winding, and the wherein the winding separator is disposed under a second one of the control power secondary winding and the auxiliary power secondary winding.

2. The welding type power supply of claim 1, wherein the winding separator is disposed over the auxiliary power secondary winding, and the winding separator is disposed under the control power secondary winding.

3. The welding type power supply of claim 2, wherein the control power secondary winding is comprised of multiple windings that provide a plurality of voltages.

4. The welding type power supply of claim 1, wherein the winding separator includes at least one protruding lip, wherein the protruding lip provides for electrical insulation and increases the creepage distance between the auxiliary power secondary winding and the control power secondary winding.

5. The welding type power supply of claim 4, wherein transformer further includes a primary bobbin having a primary winding wound thereon.

6. The welding type power supply of claim 1, wherein a plurality of fins define air vents between the winding separator and the bobbin to allow air flow to the first one of the control power secondary winding and the auxiliary power secondary winding.

7. The welding type power supply of claim 6, wherein the fins are on the winding separator and provide structural support to the winding separator.

8. The welding type power supply of claim 6, wherein the winding separator includes at least one protruding lip, wherein the at least one protruding lip provides for electrical insulation and increases the creepage distance between the control power secondary winding and the auxiliary power secondary winding.

9. The welding type power supply of claim 8, wherein the plurality of fins extend along the at least one protruding lip.

10. The welding type power supply of claim 8, wherein the at least one protruding lip includes two protruding lips.

11. A welding type power supply, comprising: a power circuit, disposed to receive input power and provide welding type power to a welding output, control power to a control power output, and auxiliary power to an auxiliary power output; and a control circuit connected to control the power circuit and connected to receive the control power output; wherein the power circuit includes a transformer, and the transformer has a primary winding, a control power secondary winding in electrical communication with the control power output, and an auxiliary power secondary winding in electrical communication with the auxiliary power output, and further wherein the transformer includes a secondary bobbin having the control power secondary winding and the auxiliary power secondary winding wound thereon, wherein a plurality of air vents are disposed on the secondary bobbin to allow air flow into the bobbin, and further wherein the transformer has a primary bobbin having the primary winding wound thereon; a winding separator disposed between the auxiliary power secondary winding and the control power secondary winding, wherein the winding separator includes fins that define the plurality of air vents by offsetting the winding separator from the bobbin.

12. The welding type power supply of claim 11, wherein the fins provide structural support to the winding separator.

13. The welding type power supply of claim 12, wherein the winding separator includes at least one protruding lip, wherein the at least one protruding lip provides for electrical insulation and increases the creepage distance between the control power secondary winding and the auxiliary power secondary winding.

14. The welding type power supply of claim 13, wherein the plurality of fins extend along the at least one protruding lip.

15. The welding type power supply of claim 13, wherein the at least one protruding lip includes two protruding lips.

16. The welding type power supply of claim 11, wherein the winding separator is disposed over the auxiliary power secondary winding, and the winding separator is disposed under the control power secondary winding.

17. The welding type power supply of claim 16, wherein the control power secondary winding is comprised of multiple windings that provide a plurality of voltages.

* * * * *